3,058,918
PAINT STRIPPING COMPOSITION AND METHOD
Eugene M. Gatza, Bay City, Mich., assignor to The Dow Chemical Company, Midland, Mich., a corporation of Delaware
No Drawing. Filed Dec. 28, 1959, Ser. No. 862,073
11 Claims. (Cl. 252—139)

This invention relates to a composition and method for stripping paint from surfaces.

It is known in the art that aqueous sodium hydroxide solutions are used for stripping paint from surfaces. However, it has now been found that the incorporation of certain additives into an aqueous alkali metal hydroxide solution accelerates the paint stripping process. Those additives which have been incorporated singly into aqueous alkali metal hydroxide solutions and have imparted to the solutions the property of stripping paint from surfaces more rapidly than aqueous medium hydroxide solutions per se, are polyethylene glycols having the formula:

$$HO-(CH_2CH_2-O)_n-H$$

wherein $n$ is an integer from 2 to about 5.

The compositions of the present invention are useful for removing the common commercial types of paints and coatings, such as alkyd, alkyd-melamine, epoxy, vinyl, chlorinated rubber, styrene-butadiene latex and conventional drying oil types of paints, varnishes and lacquers.

In the method of the present invention, the surface from which it is desired to remove the paint is brought into contact with an aqueous alkali metal hydroxide solution containing from about 10 to about 30 percent by weight of an alkali metal hydroxide, preferably from about 20 to about 30 percent by weight, and from about 2 to about 15 percent by weight of the polyethylene glycol, preferably from about 6 to about 9 percent by weight. The paint-stripped objects are then removed from contact with the paint stripping composition and washed or rinsed, preferably with water.

The compositions resulting from the incorporation of the previously described additives into aqueous alkali metal hydroxide solutions comprise then one aspect of the present invention.

A second aspect of the present invention arises from the discovery that the addition of about 1 to about 8 percent of an alkali metal or alkaline earth silicate to the paint stripping composition is helpful in removing thicker coatings of paint, particularly styrene-butadiene latex paint, and in removing primer coatings, and also in those instances where a phosphate-type coating has been applied to the surface prior to a conventional primer coat. The alkali and alkaline earth silicates are also helpful in removing the last traces of pigment that frequently adhere to the surface.

The incorporation of an alkali or alkaline earth silicate into the compositions hereinbefore described comprises then a second aspect of the present invention.

The temperature for the paint stripping process is maintained desirably above about 60° C., preferably at about the boiling temperature of the paint stripping composition. Temperatures substantially below boiling, while operable, markedly increase the required stripping time. In addition, it is within the scope of the present invention to enclose the containing vessel for the paint stripping composition and to employ superatmospheric pressure as a means of raising the boiling temperature of the stripping composition.

It has been reported that dipropylene glycol has been employed as an additive for aqueous sodium hydroxide solutions used for stripping from metal surfaces a paint system consisting of 1 coat of epoxy primer and 1 coat of alkyd-melamine enamel. However, it has been found that the composition containing dipropylene glycol only partially removed the paint from metal objects, whereas a composition consisting of tetraethylene glycol in aqueous sodium hydroxide solution completely removed the paint from the same type of metal objects when run under the same conditions. There are shown in Table I the results of comparative evaluation of the dipropylene glycol-aqueous sodium hydroxide solution with the tetraethylene glycol-aqueous sodium hydroxide solution employing identical conditions of sodium hydroxide concentration, temperature, type and number of coats of paint, and duration of contact of the composition with the painted metal surface. (The dipropylene glycol concentration of 4½ percent by weight represented the maximum solubility in the aqueous sodium hydroxide.)

Table I

| | Dipropylene Glycol-sodium Hydroxide | Tetraethylene Glycol-sodium Hydroxide |
|---|---|---|
| Type of Paint and Number of Coats | 1 Coat Epoxy Primer, 1 Coat Alkyd-Melamine Enamel. | 1 Coat Epoxy Primer, 1 Coat Alkyd-Melamine Enamel. |
| NaOH Concentration, by weight | 23 percent | 23 percent. |
| Operating Temperature | 115° C | 115° C. |
| Concentration of Additive | 4½ percent | 8 percent. |
| Contact Time | 1.5 minutes | 1.5 minutes. |
| Per Cent Paint Removal | 60 | 100. |

In an analogous manner, improved performance has been shown by other polyethylene glycol-aqueous sodium hydroxide solutions of the present invention over those containing dipropylene glycol.

The advantage of the method and compositions of the present invention over an aqueous sodium hydroxide solution containing no additives is of particular significance when applied to commercial-scale processes where paint removal operations are required. Accelerated paint stripping as shown by the experiments which follow, obviously results in a substantially greater work production rate.

In the experiments that follow there is shown the advantage gained by employing the compositions of the present invention as compared to an aqueous solution containing only sodium hydroxide.

In each of a series of controlled experiments, a number of steel rods were given one coat of priming paint and at least one coat of finishing enamel and the paint cured for sufficient time after each coat to insure complete drying. For a given type of paint that was evaluated, two series of specimen rods were employed, one series of which was treated with a composition of the present invention, and the other treated with aqueous sodium hydroxide, with or without sodium orthosilicate, as designated. In all of the experiments, the compositions were maintained at their boiling temperatures. The steel rods were immersed in the boiling solutions, allowed to remain therein for the designated period of time, then withdrawn, rinsed with hot water, and the percentage of paint removal was visually estimated.

Table II

| Number of Coats Type of Paint | NaOH, Percent | Polyglycol, Percent | Sodium Silicate, Percent | Immersion Time | Percent Paint Removed |
|---|---|---|---|---|---|
| 1 Epoxy primer, 1 Alkyd-Melamine Enamel. | 25 | 8 TTEG[1] | None | 1.5 Min | 100 |
| Do | 25 | 7 TTEG | None | 1.5 Min | 75 |
| Do | 20 | 8 TTEG | None | 1.5 Min | 65 |
| Do | 20 | None | None | 3.0 Min | None |
| Do | 25 | 8 TEG[2] | None | 1.5 Min | 100 |
| 1 Epoxy Primer, 1 Epoxy Enamel. | 20 | None | 5 | 2 Min | None |
| Do | 20 | 8 TTEG | 3 | 1.5 Min | 100 |
| 1 Epoxy Primer, 1 Alkyd Enamel. | 20 | None | None | 2 Min | 100 |
| Do | 23 | 8 TTEG | None | 35 Sec | 100 |
| 1 Epoxy Primer, 4 Chlorinated Rubber. | 20 | None | None | 1 Hr | 100 |
| Do | 23 | 8 TTEG | None | 0.5 Hr | 100 |
| 1 Epoxy Primer, 1 Vinyl Enamel. | 20 | None | None | 1 Hr | None |
| Do | 23 | 8 TTEG | None | 1 Hr | 100 |

[1] Tetraethylene glycol.
[2] Triethylene glycol.

I claim:

1. A composition consisting essentially of an aqueous solution of from about 10 to 30 percent by weight of an alkali metal hydroxide and from about 2 to 15 percent by weight of a polyethylene glycol having the formula:

$$HO-(CH_2CH_2-O)_n-H$$

wherein $n$ is an integer from 2 to about 5, the remainder being essentially water.

2. A composition consisting essentially of an aqueous solution of from about 10 to 30 percent by weight of an alkali metal hydroxide, from about 2 to 15 percent by weight of a polyethylene glycol having the formula:

$$HO-(CH_2CH_2-O)_n-H$$

wherein $n$ is an integer from 2 to about 5, and from about 1 to about 8 percent by weight of a silicate selected from the group consisting of alkali metal and alkaline earth silicates, the remainder being essentially water.

3. A composition as in claim 1 wherein the alkali metal hydroxide is sodium hydroxide.

4. A composition as in claim 1 wherein the concentration of the polyethylene glycol is from about 6 to about 9 percent by weight of the said solution.

5. A composition as in claim 1 wherein the polyethylene glycol is triethylene glycol.

6. A composition as in claim 1 wherein the polyethylene glycol is tetraethylene glycol.

7. A composition as in claim 1 wherein the concentration of the alkali metal hydroxide is from about 20 to about 30 percent by weight.

8. A composition as in claim 2 wherein the concentration of the silicate is from about 3 to about 5 percent by weight of said solution.

9. A composition as in claim 7 wherein the alkali metal hydroxide is sodium hydroxide.

10. A process for removing coatings of alkyd, alkyd-melamine, epoxy, vinyl, chlorinated rubber, styrene-butadiene latex, and drying oil type paints and lacquers and varnishes from surfaces comprising contacting said coatings with the composition of claim 1.

11. A process as in claim 10 wherein said composition is maintained at a temperature of from about 60° C. to its boiling temperature.

References Cited in the file of this patent

UNITED STATES PATENTS 2,479,628    Kuentzel    Aug. 23, 1949
2,662,837    Duncan    Dec. 15, 1953